W. E. WILLIAMS.
RAILWAY CAR TRUCK CENTER BEARING.
APPLICATION FILED AUG. 27, 1914.
1,191,862.
Patented July 18, 1916.
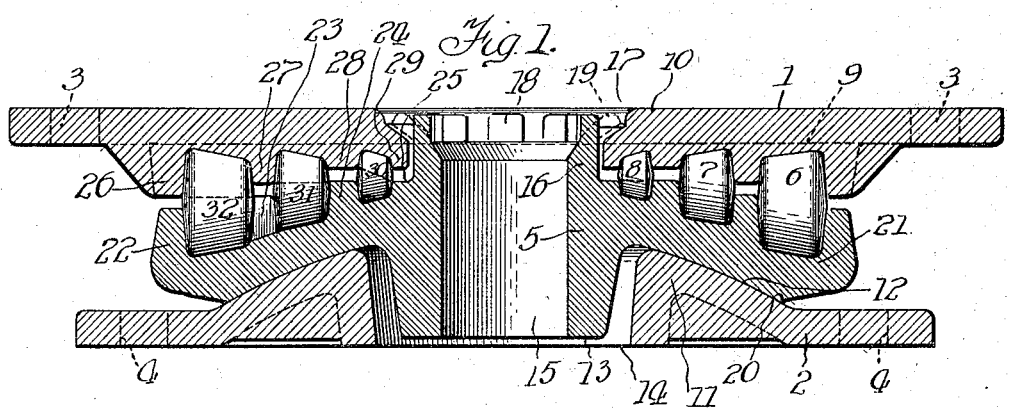
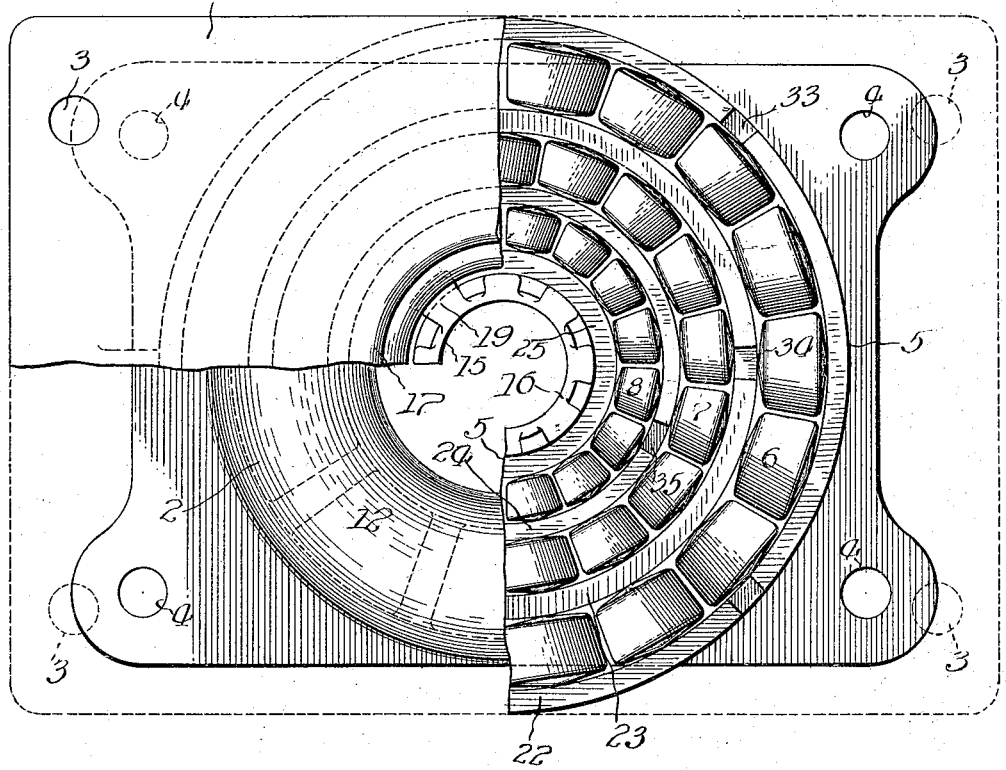
Witnesses:
Inventor:

UNITED STATES PATENT OFFICE.

WILLIAM ERASTUS WILLIAMS, OF CHICAGO, ILLINOIS.

RAILWAY-CAR-TRUCK CENTER-BEARING.

1,191,862.

Specification of Letters Patent. Patented July 18, 1916.

Application filed August 27, 1914. Serial No. 858,793.

*To all whom it may concern:*

Be it known that I, WILLIAM ERASTUS WILLIAMS, a citizen of the United States, and a resident of Chicago, in the county of Cook and State of Illinois, have invented a new and useful Improvement in Railway-Car-Truck Center-Bearings, of which the following is a specification.

My invention relates to that class of bearings which are known as anti-friction bearings, and I prefer to use rollers for the anti-friction devices although I may use balls.

The object of my invention is to produce an anti-friction center bearing which, while it may be cheaply constructed, will meet the requirement of the service and last the normal life of the car.

Reference will be had to the accompanying drawing in which—

Figure 1 is a central vertical sectional elevation of the bearing. Fig. 2 is a plan view showing the upper plate with portions broken away to show portions of an equalizer plate and rollers and of a plate below and supporting the equalizer plate.

I prefer to use three annular concentric races separated by rigid walls, and in these three sets of frusto-conical rollers each of a length less than its diameter and the rollers of each set being of greater diameter than the rollers of the succeeding set nearer the center of the races.

In the drawing, 1 indicates the top plate which is fastened to the car body bolster, and 2 indicates the bottom plate which is fastened to the truck bolster. Suitable rivet holes 3 and 4 are provided for fastening these plates to their respective bolsters.

5 indicates the intermediate or equalizer plate.

6, 7 and 8 indicate the three sets of rollers and each set of rollers are made of requisite diameters to fill their respective race ways with a suitable number of rollers regardless of whether or no the rollers of one race way are greater or less in number than those of a companion race way.

The several races are at substantially the same distance from the upper face of the plate 1, as shown, so that the axes of the rollers in any set are not in the plane of the axes of the rollers of any other set, or in other words, the larger the roller the greater the distance of its axis from the upper face of the plate 1. This construction gives many advantages over having all the axes in the same plane, and especially avoids useless metal and allows smaller clearance space than is usually required.

The truck bolster plate 2 is provided with a spherical segmental projection 11 which articulates at the surface 12 on the plate 5 which is curved to fit the curve of the projection 11. The plate 5 is provided with a projection 13 which projects down into the aperture 14 of plate 2 and through the plate 5 there is the hole 15 through which extends the king bolt or center pin of the car truck.

There is such clearance between the projection 13 of plate 5 and the side walls of the aperture 14 of plate 2 as readily permits any rocking motion that may occur between the car body bolster and the truck bolster.

An annular projection 16 of plate 5 extends up through an aperture 17 in plate 1 and this projection 16 is provided with separated points or lugs 18 which may be bent over as indicated by the dotted line 19 to lock the plates 1 and 5 together after the same have been properly assembled.

The contact faces at 12 between the plates 2 and 5 are so arranged that their outer line 20 is less distant from the center than the outer portions of the bearing surfaces of the rollers 6, so that a strong rocking thrust so momentary that the surfaces at 12 do not slip upon each other cannot be transmitted through a single roller 6 to the plate 2, directly but must be transmitted through the bodies 5, 11 at a materially less distance from the center than the distance of the outer portions of the rollers 6 therefrom, and thus the thrust will always be borne by a plurality of rollers; and while there may be a much severer load on one side of the bearing than on the other, there will always be some load on all the rollers all the time.

Between the race ways of my several sets of rollers 6, 7, and 8, there are the wall flanges 22, 23, 24 and 25 on the plate 5, and 26, 27, 28 and 29 on the plate 1, and these flanges are so arranged that there is practically a direct resistance of all the flanges to horizontal or shearing force which must be transmitted through many rollers and distributed by the rollers to a large part of each flange above or below the horizontal planes of the lines 30, 31, 32.

The annular projection 13 of plate 5 is sufficiently strong and engages in the cavity 14 of plate 2 to a sufficient depth to always resist the shearing or thrust strain as above described whenever these strains are so great as not to be taken up by the spherical surface of the projection 11 of plate 2. Whenever shocks occur which displace the projection 11 in relation to plate 5 whereby the projection 13 of plate 5 comes directly in contact with side walls of the aperture 14 of plate 2 the parts immediately return to normal position, and the antifriction devices are never materially disturbed.

The arrangement of the several race ways of the roller as described whereby the minimum thickness of plate 1 is maintained as indicated by the dotted line 9, permits for the surfaces at 12 a spherical curvature such that certain strains from the car and load will cause slipping of these surfaces one upon the other. With the larger radius of curvature or flatter contact surfaces usually employed, there is no such slipping and no shifting of the center of pressure.

Of course any curve desired for the surface 12 may be secured in the other designs by making the clearance depth over all of the bearing greater, but as before stated then the bearing cannot be used in the cars within the spaces ordinarily provided for it. Further when the bearing is made deeper it involves more weight of metal and adds expense.

The rollers designed as I have shown require no trunnions and are the cheapest and simplest that can be made of this class, and can be made more easily all of uniform sizes than is the case with rollers which require trunnions.

To facilitate the escape of dust from the races and the passage of oil from the kingbolt opening thereto, notches 33, 34, 35 are provided in the race walls or flanges and are placed out of radial alinement, to avoid weakening along any direct line of fracture.

The plates of a bearing of this kind are usually made out of cast steel but are sometimes made of malleable iron or drop forgings. I prefer to make mine of cast steel or of any suitable material that would have sufficient strength and be sufficiently malleable to work as described. The design of this bearing is such that it may be made of drop forgings, which is a great desideratum.

What I claim is:

1. The combination with a body bolster plate having below concentric race forming flanges and a truck bolster plate having a central upwardly projecting spherically curved projection, of an intermediate equalizer plate provided below with a concave frictional surface fitting said projection and above with integral flanges forming races registering, respectively with the races first mentioned, and annular sets of conical rollers filling the races vertically, the rollers of each set being of greater diameter than those of a set nearer the axis of the races, whereby the bodies of the bolster plate and the equalizer plate are of approximately uniform thickness and the most violent strains are borne by large rollers.

2. In a device of the class described, the combination with centrally apertured body and truck plates, of an intermediate equalizer member articulating with one of said plates, by means of a spherically curved projection engaging in a corresponding recess, and provided above and below with central projections extending into the apertures of said plates, respectively, and antifriction devices between said member and the other of said plates.

3. The combination with top and bottom plates gradually increasing in distance apart in passing outward from the axis of rotation, of an equalizing plate between said top and bottom plates, and concentric annular sets of rolling anti-friction members, between the equalizing plate and one of the other plates, having all their extreme upper and lower bearing points approximately equidistant from the outer faces of the two plates between which they lie.

4. In a device of the class described, the combination with top and bottom plates one of which is provided with a central spherical boss having a central opening, of an intermediate equalizer plate provided with a projection entering said opening and with a recess adapting it to fit over said boss and rock upon the same, and rotating antifriction members interposed between the equalizer plate and the plate having no boss, said equalizer plate and the plate having no boss being locked against separation.

5. In devices of the class described, the combination with top and bottom plates and an intermediate equalizer plate, of concentric sets of frusto-conical rollers between said intermediate plate and one of the other plates, the rollers of each set being of greater diameter than the rollers of any set nearer the axis of the sets and all the rollers having their lines of contact with the outer plate approximately parallel to and equidistant from the outer face of said outer plate.

6. In a device of the class described, the combination with an outer plate having a central spherically curved boss with a central aperture, of an equalizing plate provided with a recess to receive said boss and with a tubular projection extending into said opening and on the opposite face with annular race-forming flanges, a second outer plate provided with similar flanges adapted to register with those first mentioned and form co-acting races, and rotating antifriction members located in said races and adapted to transmit lateral thrusts from the flange of one member to those of the companion member.

Signed at Chicago, in the county of Cook and State of Illinois August 24th, 1914.

WILLIAM ERASTUS WILLIAMS.

Witnesses:
H. A. FORSBERG,
A. D. SHANKLIN.